July 20, 1948.  E. V. K. JAYCOX  2,445,731
TIRE INSPECTION DEVICE
Filed April 7, 1945
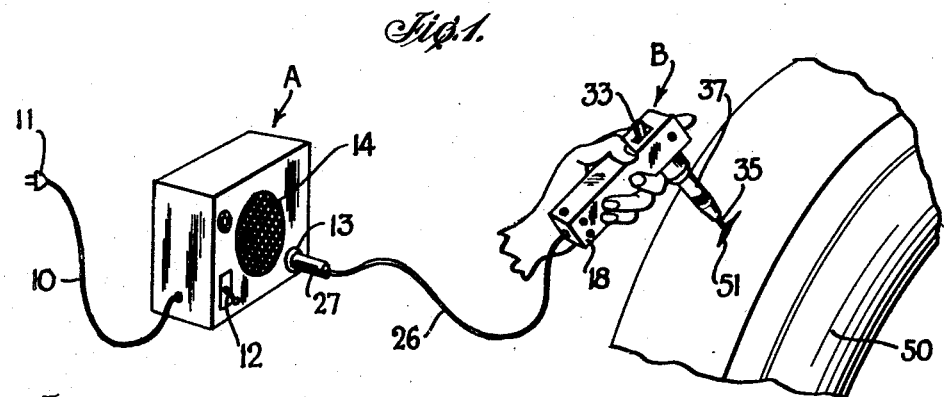
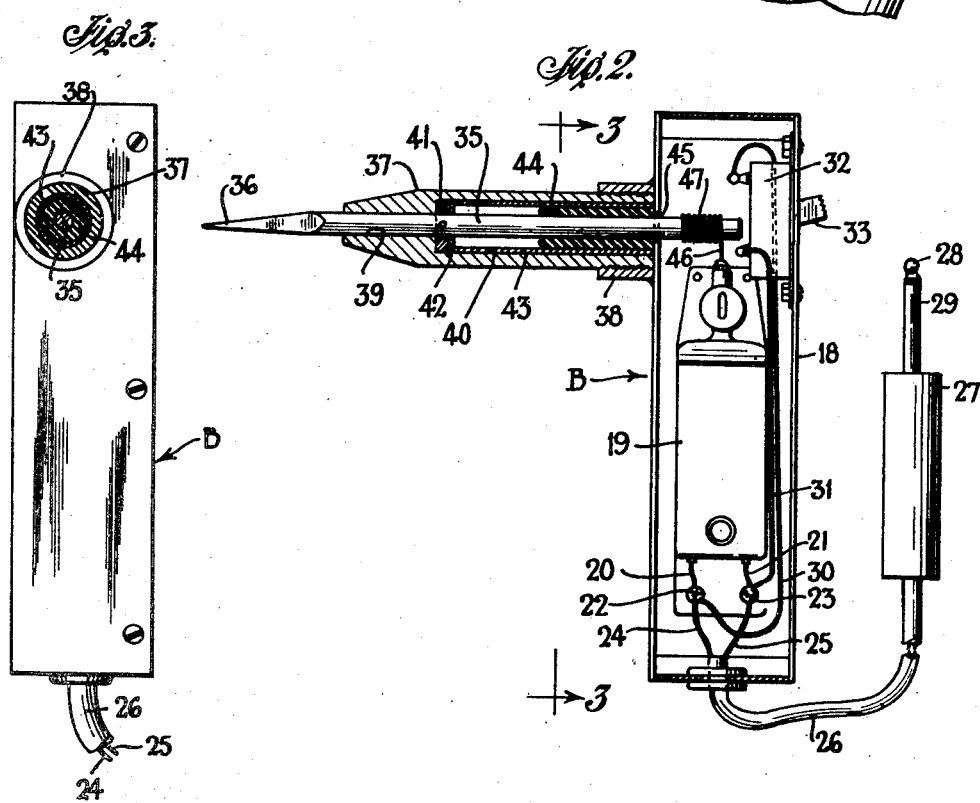
INVENTOR
EDWARD V. K. JAYCOX
BY  Ely & Frye
ATTORNEYS Patented July 20, 1948

2,445,731

UNITED STATES PATENT OFFICE 2,445,731

TIRE INSPECTION DEVICE

Edward V. K. Jaycox, Akron, Ohio, assignor to The Firestone Tire & Rubber Company, Akron, Ohio, a corporation of Ohio Application April 7, 1945, Serial No. 587,181

1 Claim. (Cl. 177—311)

This invention relates to tire inspection devices that are used to determine the presence of hard foreign material, such as stones, metal, glass and the like, that may be embedded within the structure of rubber tires, and more especially it relates to inspection devices of the character mentioned whereof the presence of such foreign material is evinced by an audible signal.

As is well known, rubber vehicle tires frequently are cut or slit, especially on the tread portion thereof, by any of the hard, loose objects over which the tires may pass while in service, which objects may remain in said slits or cuts. Furthermore, slits or cuts in tire will pick up and retain foreign material therein. If such material is allowed to remain in the tire, the flexing of the tire incidental to use will cause the material to work its way deeper into the tire, and eventually may result in failure thereof.

Heretofore, the locating of foreign material in a tire structure has required the probing of visible cuts in a tire, a tool such as a screw-driver being used for the purpose and the operator depending upon his sense of feel to detect the presence of any foreign material in the cut. However, the presence of some objects is not detected readily by the sense of feel, and since many of the older tires may have numerous cuts, the prior method of inspecting tires not only was time consuming, but produced uncertain results.

The chief objects of the invention are to provide a tire inspection device that operates on a new and improved principle; to provide a device of the character mentioned that will disclose the presence of foreign material in a tire structure by means of an audible signal; and to provide a device of the character mentioned that is capable of use for removing the foreign material. Other objects will be manifest as the description proceeds.

Of the accompanying drawing:

Fig. 1 is a perspective view of the improved inspection device, and a fragmentary portion of a tire casing, showing how said device is employed to detect foreign material in a cut in the tire;

Fig. 2 is a sectional view on a larger scale, showing the interior of the manipulable element of the device; and Fig. 3 is a section on the line 3—3 of Fig. 2.

Referring to Fig. 1 of the drawing, there is shown a tire inspection device comprising a sound-amplifying mechanism that is designated as a whole by the character A, and a manually operable tool that is designated as a whole by the character B.

The amplifying mechanism A is a standard audio-frequency amplifier such as commonly is employed in radio sets and other sound-reproducing devices, and no invention is claimed therefor. As shown, the amplifier A is provided with a cord 10 and plug 11 by which it may be connected to any convenient outlet of a 110 volt power line. The amplifier A could be made fully portable and self-contained by operating it by means of batteries enclosed within its structure. It also could be made such size as to require a fixed situs, in which case it would constitute a permanent installation. The amplifier may be provided with a control switch 12, and may include a jack 13 by which the tool B is electrically connected thereto. The front of the amplifier has a screened opening 14 through which sound is emitted.

The hand tool B comprises a container or housing 18 of a size that conveniently will fit within the hand of an operator. Mounted within the housing 18 is a piezo-electric element 19 from which extend conductor wires 20, 21, said conductor wires being secured to respective posts or terminals 22, 23 located within the housing. Also connected to posts 22, 23 are respective conductor wires 24, 25 respectively of a flexible cord or cable 26, the latter extending through a bushed aperture in an end of the housing, and having its end that is exteriorly of the housing provided with a plug 27 that is receivable in the jack 13 of the amplifier A. The plug 27 comprises tip and sleeve contacts 28, 29 respectively with which the conductor wires 24, 25 are electrically connected. Also attached to the respective posts 22, 23 are conductor wires 30, 31 that extend to a switch 32 that is located in the housing adjacent the opposite end thereof, the said switch being provided with an operating lever 33 that extends through the rear wall of the housing in position for convenient manipulation by the thumb of an operator who is holding the housing in his hand. By means of the switch 32 the circuit through the wires 30, 31 may be closed, thus shunting out the piezo element 19. The latter is of the type sometimes known as a crystal pickup cartridge wherein impressed mechanical vibration imparts stress upon a crystal, the latter generating voltages corresponding to the force of the impressed vibration. Such voltage is transmitted to the amplifier A and therein is translated into audible sound.

Mechanical vibration is transmitted to the piezo element 19 through the agency of a tool 35. The latter is composed of metal and has a work-engaging end 36 that may have the shape of a screw driver or a gouge, or any other shape found suitable for inserting into a slit in a tire to extract foreign material therefrom. The tool 35 is mounted in a holder 37 that is threaded into a short socket 38 that is welded or otherwise attached to the front wall of the housing 18. The holder 37 is of generally cylindrical shape, and has its outermost end portion formed with an axial bore 39 in which the tool 35 has an easy sliding fit. Rearwardly of the bore 39 the holder 37 is formed with an axial recess 40 of substantially larger diameter than the bore 39 or tool 35. The latter has a washer or collar 41 that is pinned thereon and which abuts the inner end of recess 40. Abutting the rearwardly presented face of the collar 41 is a washer 42, and abutting the latter is a metal sleeve 43 that is slidably received within the recess 40 of the holder. A bushing 44 of resilient material such as rubber is mounted within the sleeve 43, at the rear end thereof, said bushing frictionally gripping the tool 35. When the holder 37 is threaded tightly into the socket 38 as shown, the rear end of the bushing 43 abuts the front wall of the housing 18 as shown.

The tool 35 is considerably longer than the holder 37 so that its work-engaging end portion 36 extends substantially beyond said holder. Also the rear end portion of the tool extends beyond the threaded end of the holder, and the front wall of the housing 18 is apertured at 45 to enable the tool to extend therethrough, into the interior of the housing, above the piezo-electric element 19 therein. Secured to the latter, as by being soldered thereto is a stiff wire 46, which wire is wound into a spring-like coil 47 that lightly embraces the adjacent end portion of the tool 35. The arrangement is such that mechanical vibration induced in the tool 35 is transmitted to the piezo-electric element, there to effect generation of electrical voltages. Such voltage is transmitted through cord 26 to the amplifier A with the result that a raucous sound is emitted by the latter.

For use, it is only necessary to insert the plug 11 into any convenient outlet of an electric power line, such as the usual house-lighting circuit, insert the plug 27 in jack 13, and throw switch 33 to cut the piezo-electric element 19 into the circuit. The operator then grasps the housing of the tool B in his hand, and inspects a tire, such as the tire 50, Fig. 1, by probing into cuts or slits 51 therein with the tool 35. When the latter encounters only soft rubber, but little sound is emitted from the amplifier A. If, however, the tool strikes a hard foreign object such as glass, stone or metal, the amplifier will emit a loud, harsh, raucous sound. Thus the operator is audibly apprised of the presence of foreign material in the tire and its location, and such knowledge also is available to other persons nearby, for example, to owner of the tire. The operator then employs the tool 35 to remove the foreign material from the tire, preferably after throwing the switch lever 33 to effect cessation of the sound-signal.

The apparatus not only facilitates tire inspection by an operator, but should enable him more easily to convince tire owners of the need for repair service, and in some cases the need for new tires.

The device is simple in construction and operation, and achieves the several advantages set out in the foregoing statement of objects.

Modification may be resorted to without departing from the spirit of the invention or the scope thereof as defined by the appended claim.

What is claimed is:

In combination, a relatively small elongated hard probing tool adapted for insertion into a cut in a tire, said tool being adapted for removal of foreign objects from tire cuts and to set up vibrations by contact with said objects, a manipulable supporting structure for said tool enabling mechanical vibration thereof relatively of said structure, a piezo-electric element in said supporting structure, means mechanically connecting said tool to said piezo-electric element whereby vibration of the tool is transmitted to said element to effect generation of electric voltage therein, and means electrically connected to said piezo-electric element for converting said electric voltage into audible sound.

EDWARD V. K. JAYCOX.

REFERENCES CITED

The following references are of record in the file of this patent:

UNITED STATES PATENTS

| Number | Name | Date |
| --- | --- | --- |
| 1,779,907 | Dye | Oct. 28, 1930 |
| 2,012,316 | Miles | Aug. 27, 1935 |
| 2,171,433 | Powers | Aug. 29, 1939 |
| 2,321,356 | Berman | June 8, 1943 |
| 2,344,037 | Fuller | Mar. 14, 1944 |